(12) United States Patent
Lu et al.

(10) Patent No.: US 7,124,473 B2
(45) Date of Patent: Oct. 24, 2006

(54) HINGE FOR A NOTEBOOK COMPUTER

(75) Inventors: Sheng-Nan Lu, Shulin (TW); Chia-Hui Chen, Shulin (TW); Jih-Nan Tai, Shulin (TW); Wei-Chun Chen, Shulin (TW)

(73) Assignee: Shin Zu Shing Co., Ltd., Taipei Hsien (TW)

( * ) Notice: Subject to any disclaimer, the term of this patent is extended or adjusted under 35 U.S.C. 154(b) by 155 days.

(21) Appl. No.: 11/004,892

(22) Filed: Dec. 7, 2004

(65) Prior Publication Data

US 2006/0117530 A1    Jun. 8, 2006

(51) Int. Cl.
    E05D 11/08    (2006.01)
(52) U.S. Cl. .......................... 16/342; 16/337
(58) Field of Classification Search ................ 16/342, 16/337, 330, 303, 339; 361/680–683; 248/917–923; 348/373, 333.06; 455/575.1, 575.4, 575.8, 455/550.1, 90.3; 379/433.12, 433.13
    See application file for complete search history.

(56) References Cited

U.S. PATENT DOCUMENTS

| | | | | |
|---|---|---|---|---|
| 3,910,627 A * | 10/1975 | Meyer | ...................... | 296/97.12 |
| 5,713,672 A * | 2/1998 | Lu | ............................... | 384/289 |
| 5,896,622 A * | 4/1999 | Lu | ............................... | 16/342 |
| 5,950,281 A * | 9/1999 | Lu | ............................... | 16/342 |
| 6,170,120 B1 * | 1/2001 | Lu | ............................... | 16/342 |
| 6,220,759 B1 * | 4/2001 | Lu | ............................... | 384/398 |
| 6,230,365 B1 * | 5/2001 | Lu | ............................... | 16/342 |
| 6,301,748 B1 * | 10/2001 | Su-Man | ....................... | 16/342 |
| 6,530,123 B1 * | 3/2003 | Wahlstedt | ..................... | 16/342 |
| 6,657,856 B1 * | 12/2003 | Lu | ............................... | 361/683 |
| 6,775,884 B1 * | 8/2004 | Su-Man | ....................... | 16/342 |
| 6,871,383 B1 * | 3/2005 | Huang | .......................... | 16/295 |
| 6,928,700 B1 * | 8/2005 | Huong | .......................... | 16/342 |

FOREIGN PATENT DOCUMENTS

| | | | | |
|---|---|---|---|---|
| JP | 2002005152 A | * | 1/2002 | |
| JP | 2003120649 A | * | 4/2003 | |
| JP | 2003254323 A | * | 9/2003 | |
| JP | 2003269437 A | * | 9/2003 | |
| JP | 2004176840 A | * | 6/2004 | |
| KR | 2001094560 A | * | 11/2001 | |

* cited by examiner

*Primary Examiner*—Chuck Y. Mah
(74) *Attorney, Agent, or Firm*—Bacon & Thomas (57) ABSTRACT

A hinge for a notebook includes an L-shaped seat with a barrel. A pintle has a shaft extending in the barrel of the seat. A first tube, a sleeve and a second tube are in turn mounted on the shaft. The first tube and second tube are securely received in the barrel and each has a stop formed at a respective end facing the sleeve. The sleeve has two arcuate segments respectively formed at two ends and corresponding to the stops of the tubes. Thus, the sleeve can be rotated along with the shaft about the first and second tubes until one arcuate segment of the sleeve abuts the corresponding stop. Whereby, a user can raise the display with a small force to separate the display from the body and a large force to completely raise and position the display.

6 Claims, 8 Drawing Sheets

HINGE FOR A NOTEBOOK COMPUTER

BACKGROUND OF THE INVENTION

1. Field of the Invention

The present invention relates to a hinge for a notebook computer, and more particularly to a hinge by which a user can easily raise a display about a body even by using only one hand.

2. Description of Related Art

A notebook computer generally includes an LCD display pivotally mounted on a keyboard body by a hinge or hinges. A conventional hinge is composed of a seat mounted on the body, and a pintle mounted on the display. The seat has a barrel receiving a shaft of the pintle to enable the pintle to rotate about the seat.

For positioning the LCD display at a desired angle after the LCD display is raised, the clearance between the pintle and the barrel is small to provide a large friction between them. A user must use two hands and a large force to raise the display from the body to overcome the friction between the pintle and the seat.

Therefore, the invention provides a hinge to mitigate or obviate the aforementioned problems.

SUMMARY OF THE INVENTION

The main objective of the present invention is to provide a hinge for a notebook computer by which a display of the notebook computer can be easily raised from a body of the notebook computer.

Other objectives, advantages and novel features of the invention will become more apparent from the following detailed description when taken in conjunction with the accompanying drawings.

DETAILED DESCRIPTION OF THE PREFERRED EMBODIMENT

With reference to FIGS. 1 to 4, a hinge in accordance with the present invention has an L-shaped seat (10) with a lateral arm and an upright arm. A plurality of threaded holes (11) is defined in the upright arm. A barrel (12) is formed on the lateral arm. A passage (13) is defined through the barrel (12) and an inverted T-like slot (14) is defined in communication with a lower periphery of the passage (13).

A pintle (20) has a shaft (23) formed at a first end thereof and the shaft (23) extends into the barrel (12). A plurality of annular recesses (24) is defined at an outer periphery of the shaft (23) for containing lubricant. A tongue (21) is formed at a second end of the pintle (20) and a plurality of apertures (22) is defined through the tongue (21). A flange is formed between the shaft (23) and the tongue (21). A first tube (30), a sleeve (40), and a second tube (50) are in turn mounted on the shaft (23) and received the barrel (12).

The first tube (30) with a 9-shaped cross section has a first tubular part (31) with a first channel longitudinally defined through an outer periphery of the first tubular part (31). A first opening (32) is defined through the first tubular part (31). The shaft (23) extends through the first opening (32) of the first tubular part (31). A first tab (34) extends downwards from the first tubular part (31). A first stop (33) is formed at an end of the first tab (34) facing the sleeve (40). A first arcuate lug (35) is formed at a bottom of the first tab (34) and protruded at a first side of the first tab (34) opposed to the first channel and scalloped at a second side of the first tab (34). When the first tube (30) is received in the barrel (12), the first arcuate lug (35) is located in the inverted T-like slot (14) to prevent the first tube (30) from rotating about the barrel (12).

Similar to the first tube (30), the second tube (50) with a 9-shaped cross section has a second tubular part (51) with a second channel longitudinally defined at an outer periphery of the second tubular part (51). A second opening (52) is defined through the second tubular part (51). The shaft (23) extends through the second opening (52) of the second tubular part (51). A second tab (54) extends downwards from the second tubular part (51). A second stop (53) is formed at an end of the second tab (54) facing the sleeve (40). A second arcuate lug (55) is formed at a bottom of the second tab (54) and scalloped at a first side of the second tab (54) facing the second channel and protruded from a second side of the second tab (54) opposed to the second channel. When the second tube (50) is received in the barrel (12), the second arcuate lug (55) is located in the inverted T-like slot (14) to prevent the second tube (50) from rotating about the barrel (12).

The sleeve (40) is provided between the first tube (30) and second tube (50), and has a third tubular part (41) with a third opening (42). The shaft (23) extends through the third opening (42) with a small clearance between the shaft (23) and the third tubular part (41) to enable the sleeve (40) to rotate along with the shaft (23) when the pintle (20) is rotated. Two arcuate segments (42) are respectively formed at two ends of the third tubular part (41) and correspond to the first and second stops (23, 53).

Figure 1:
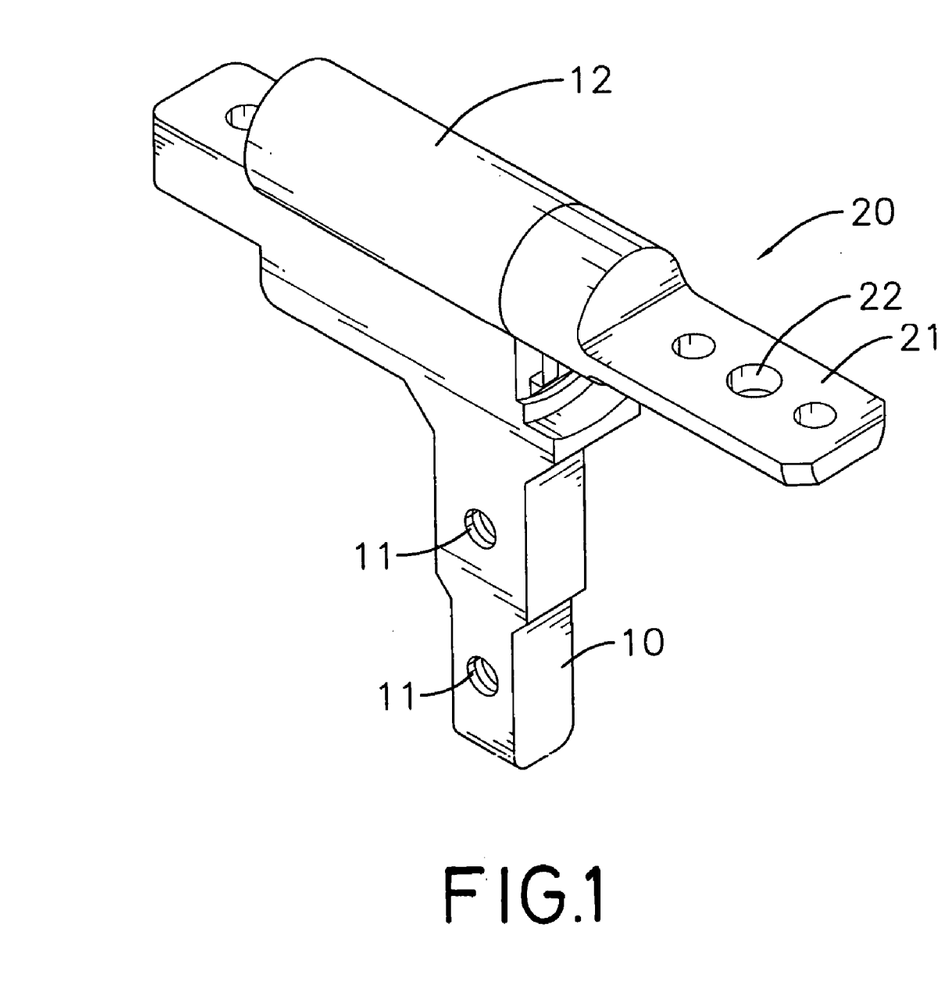
FIG. 1 is a perspective view of a hinge for a notebook computer in accordance with the present invention.
Figure 5:
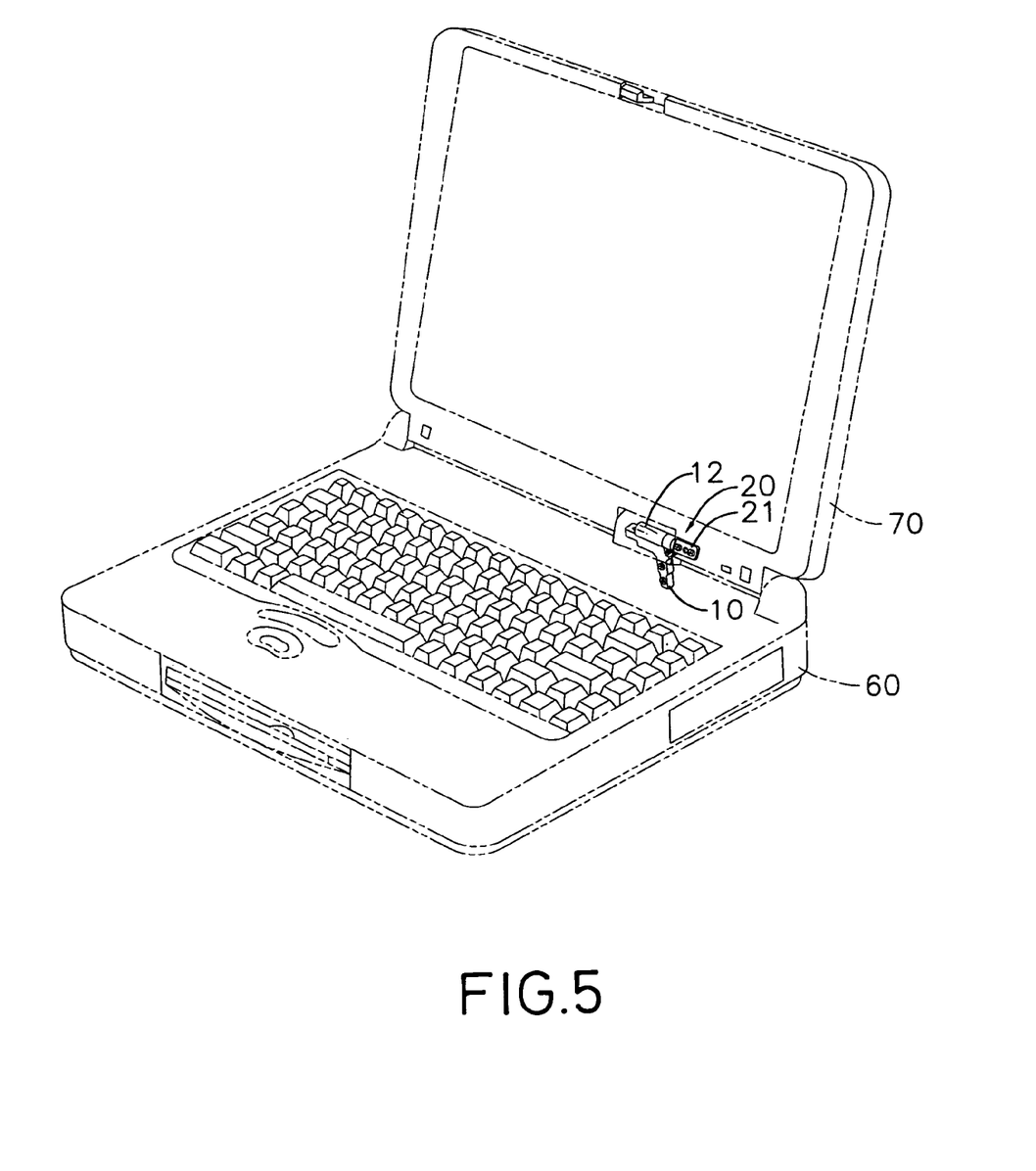
FIG. 5 is a schematic view of the hinge assembled in a notebook computer.

In assembly, as illustrated in FIGS. 1 and 5, the seat (10) is secured on a body (60) of a notebook computer by screws extended through the threaded holes (11), and the tongue (21) is secured on an LCD display (70) of the notebook computer by screws, so the display (70) can be pivoted about the body (60).

Figure 6:
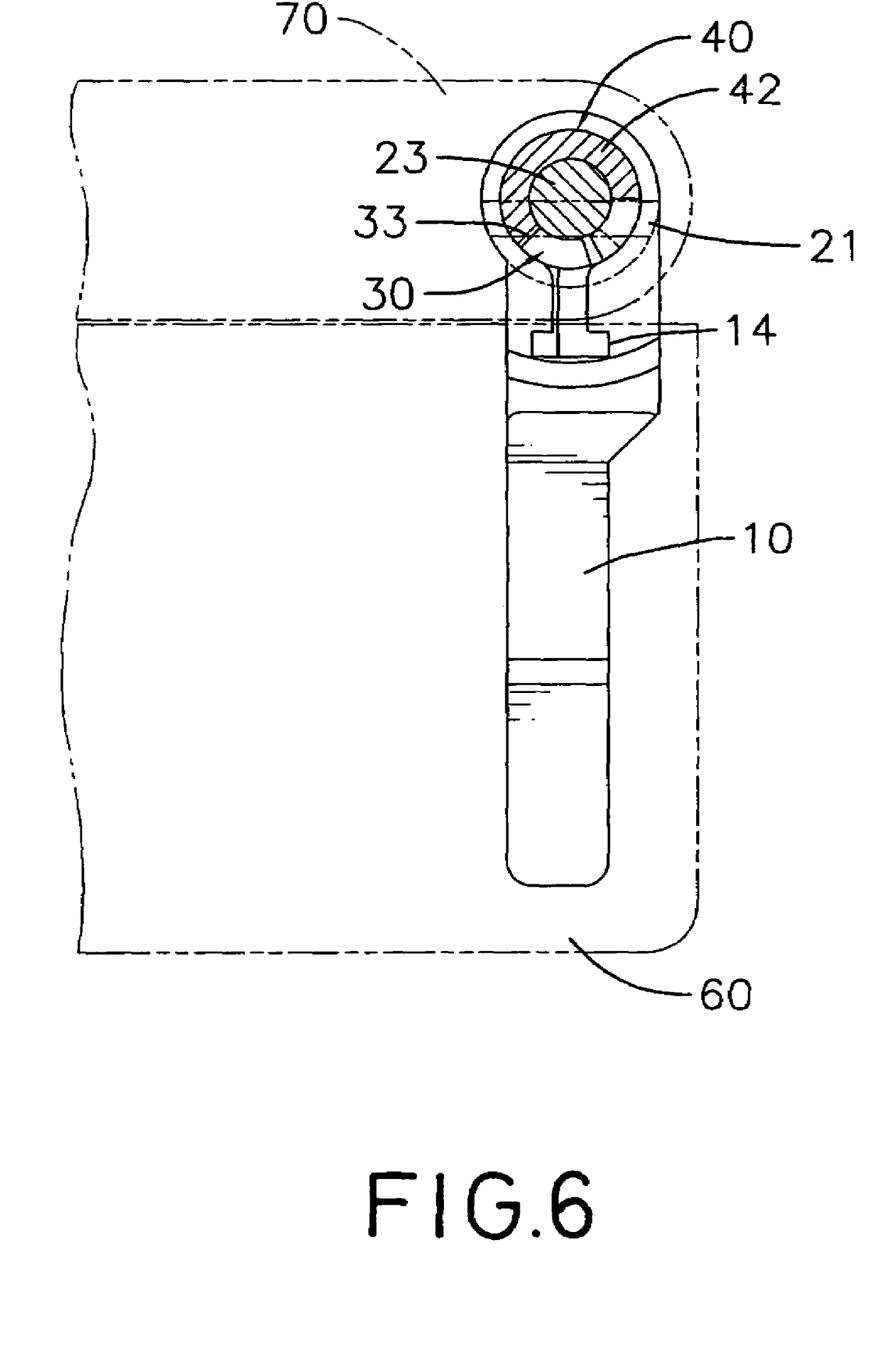
FIG. 6 is a side cross sectional view of the hinge when a display of the notebook computer abuts a body of the notebook computer.

With reference to FIG. 6, when the display (70) abuts the body (60), the arcuate segment (42) of the sleeve (40) adjacent to the first tube (30) abuts the first stop (33).

Figure 2:
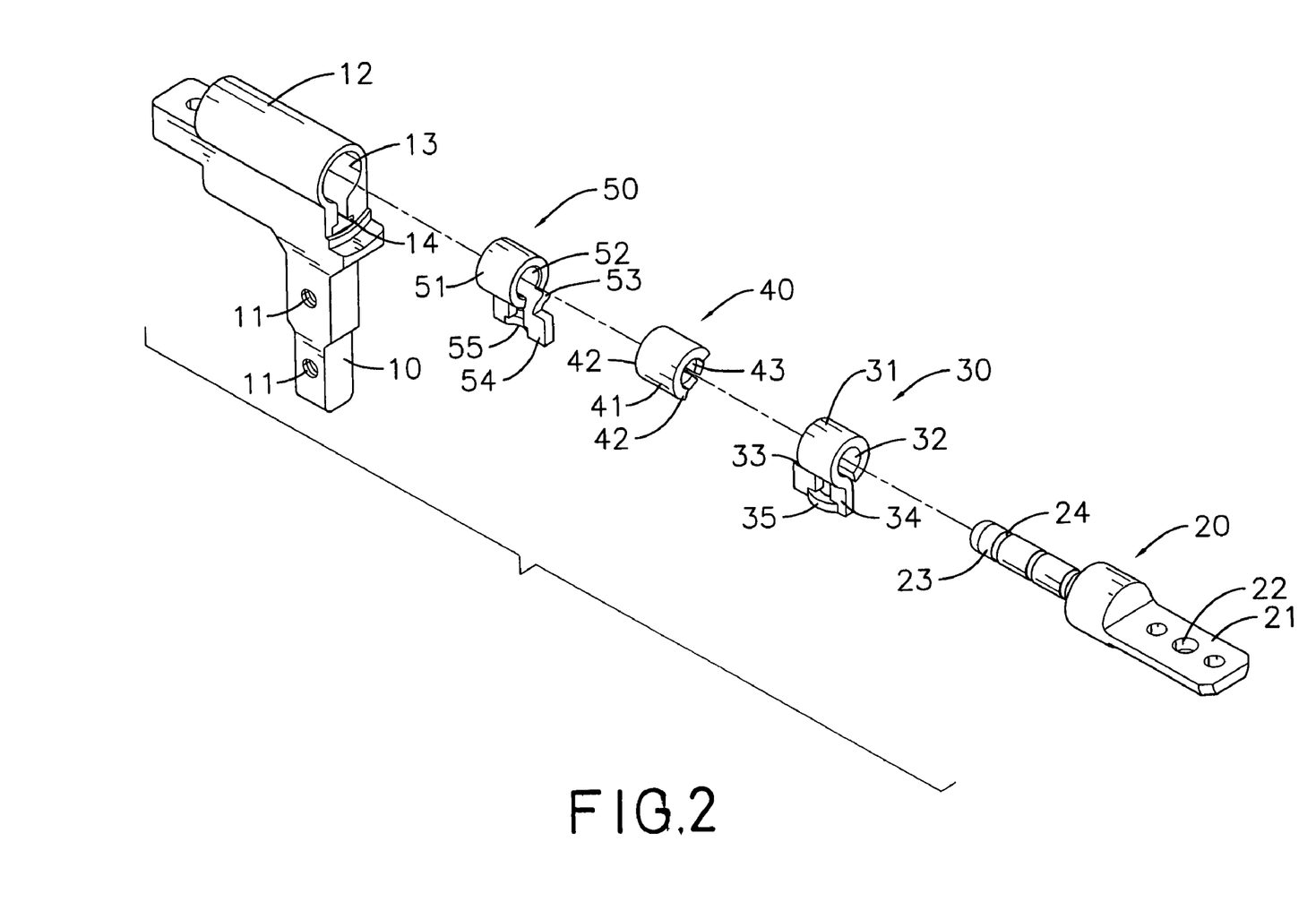
FIG. 2 is a front exploded perspective view of the hinge.
Figure 3:
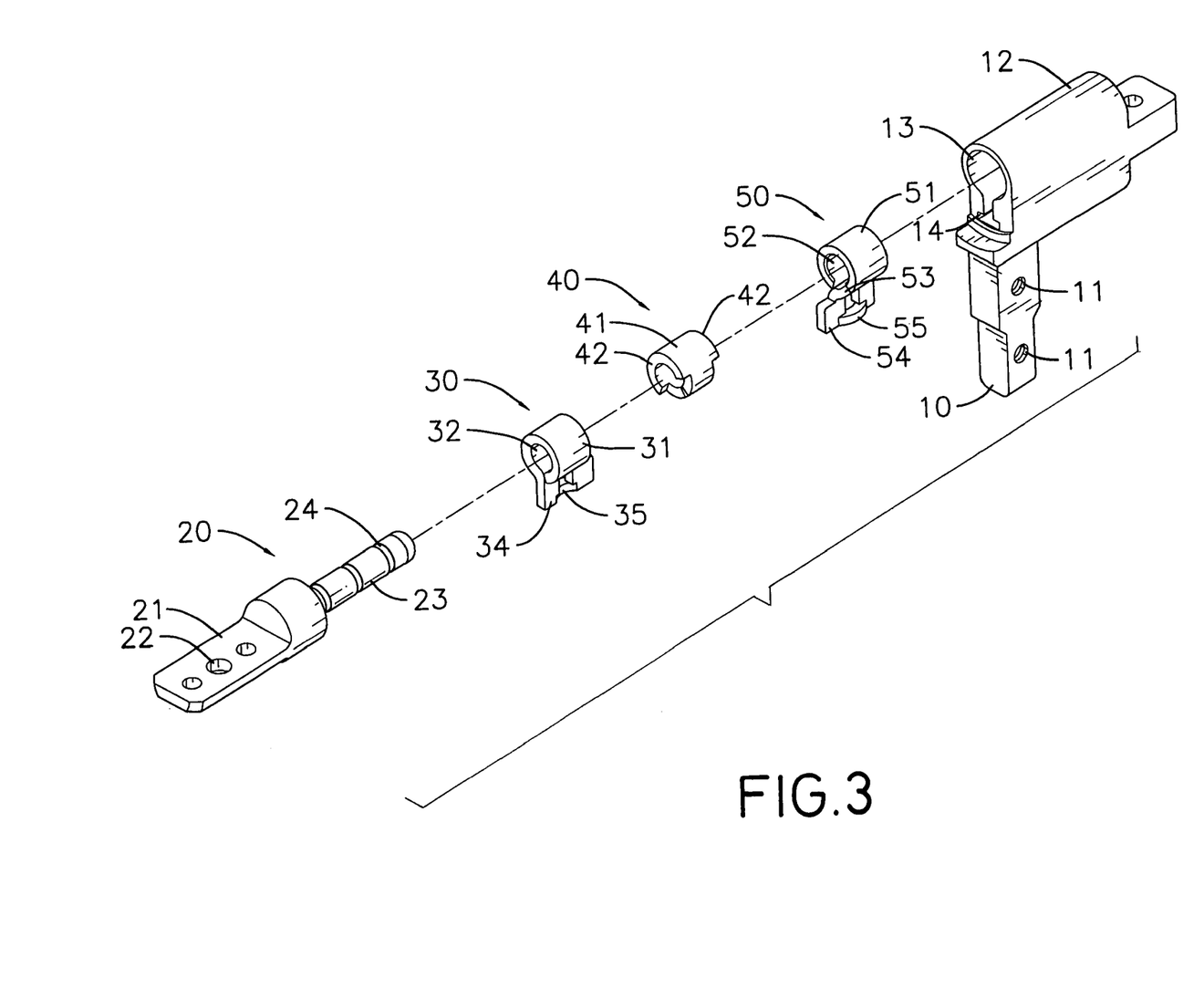
FIG. 3 is a rear exploded perspective view of the hinge.
Figure 4:
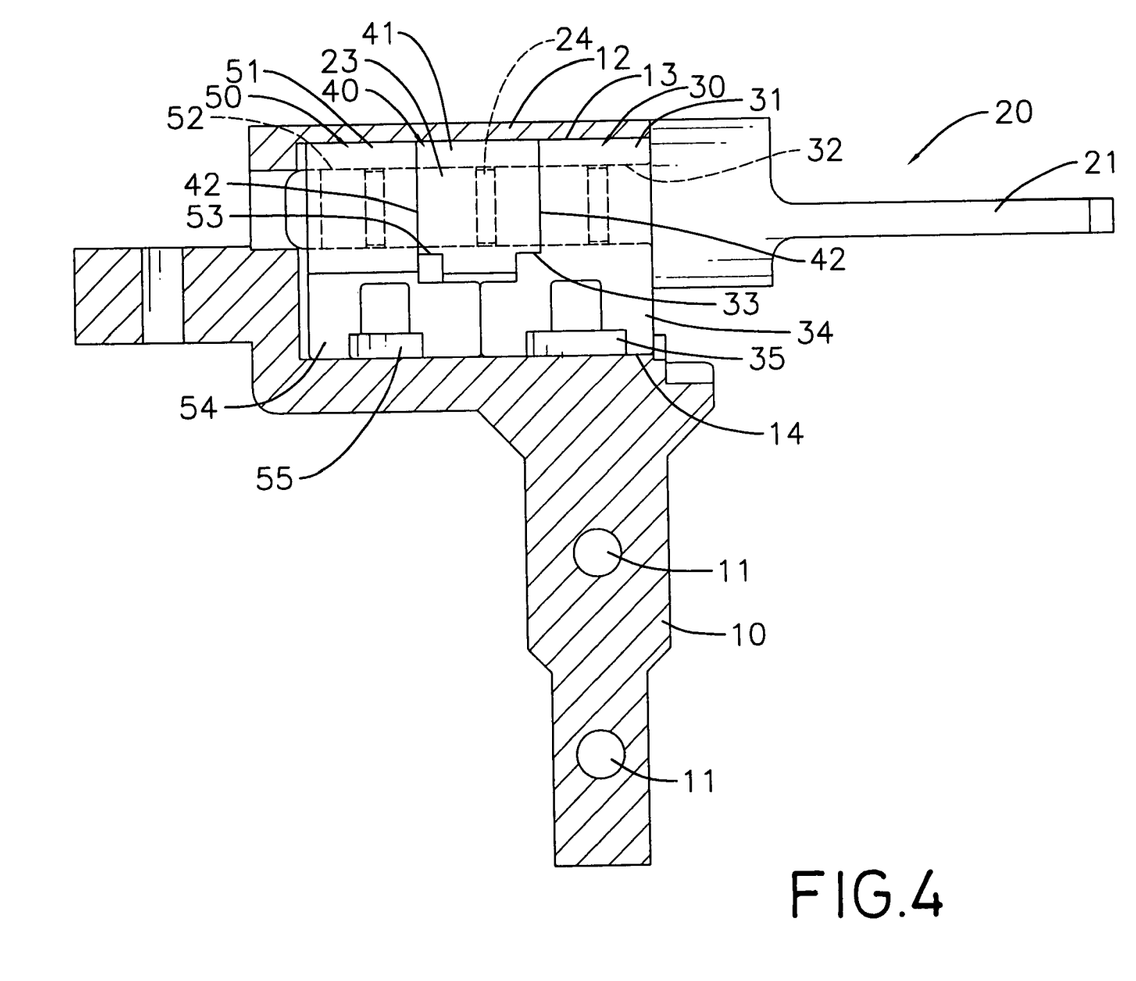
FIG. 4 is a cross sectional view of the hinge.
Figure 7:
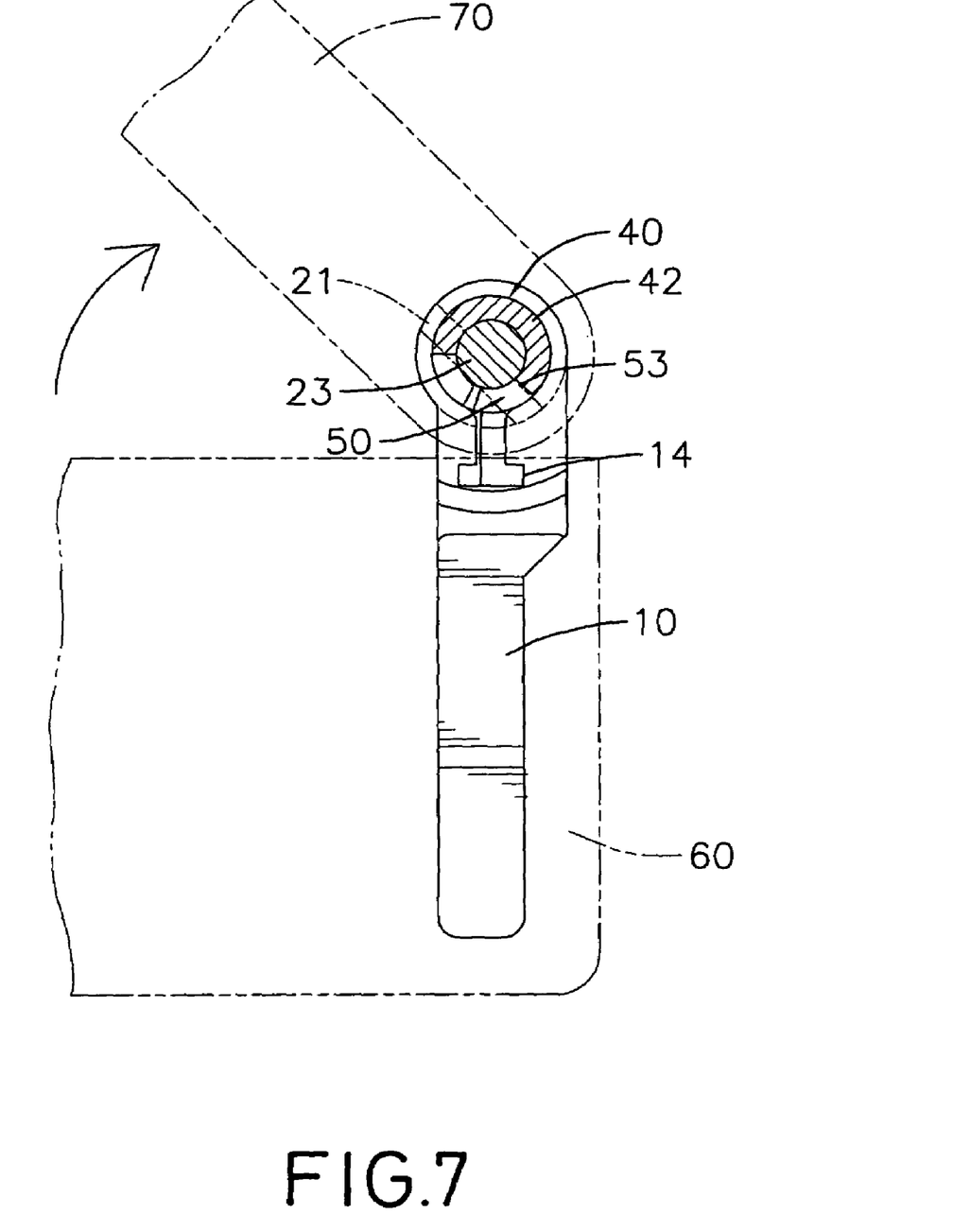
FIG. 7 is a side cross section view of the hinge when the display is being raised about the body.

With reference to FIGS. 2 and 7, when a user raises the display (70), the pintle (20) can be first rotated along with the sleeve (40) about the two tubes (30, 50). When the arcuate segment (42) adjacent to the second tube (50) abuts the second stop (53), the sleeve (40) can not be further rotated along with the shaft (23) in the barrel (12). During this process, display (70) can be easily raised from the body (60) because friction only exists between the shaft (23) and the two tubes (30, 50). Therefore, the user can easily raise the display (70), even with using only one hand.

Figure 8:
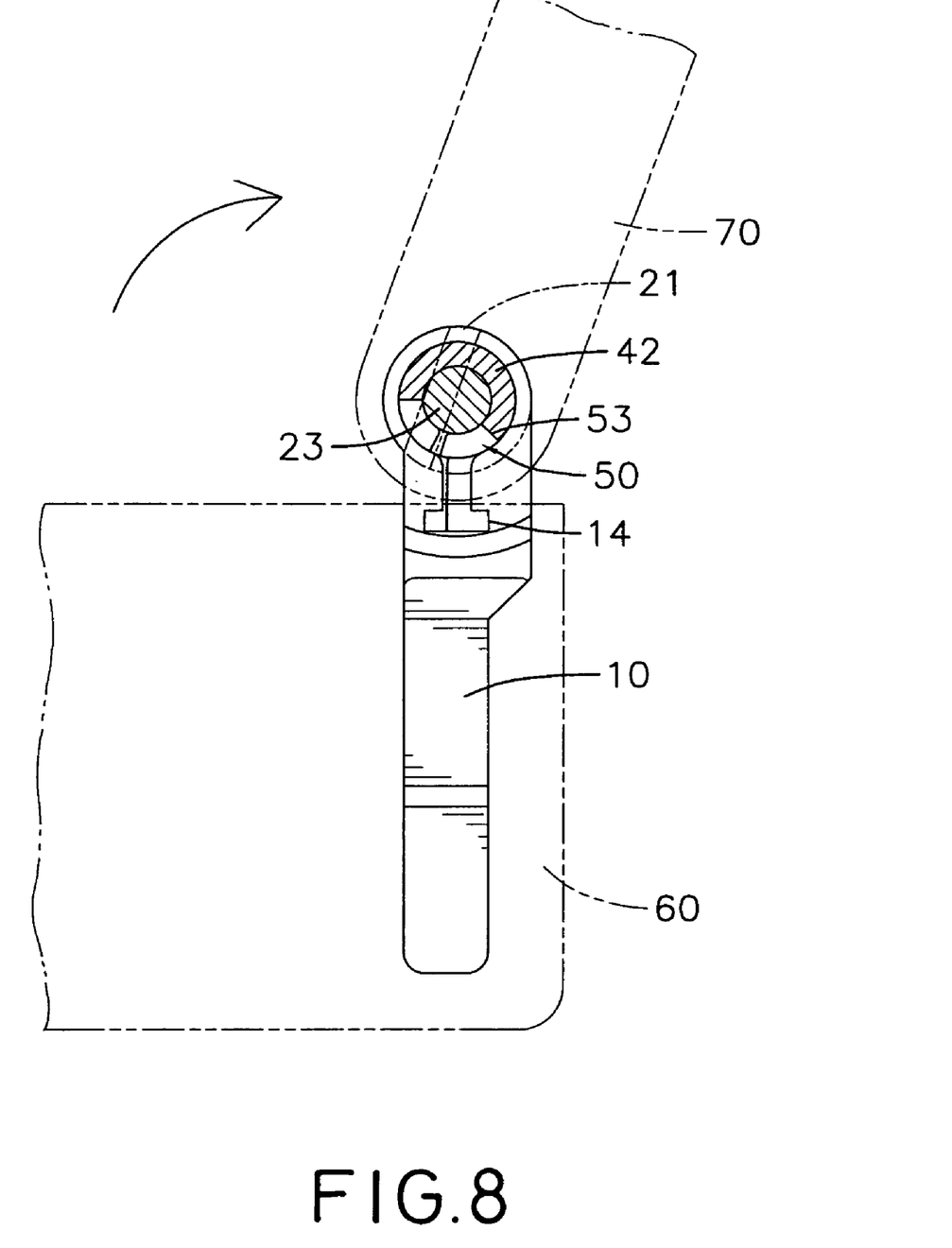
FIG. 8 is a side cross section view of the hinge when the display is completely raised.

With reference to FIGS. 5 and 8, when the user further raises the display (70), the pintle (20) is rotated about the sleeve (40) and the two tubes (30, 50). Because the clearance between the shaft (23) and the third tubular part (41) is small, the friction in rotation of the pintle (20) is large enough to position the display (70) at a desired angle.

When the user pivots down the display (70), the pintle (20) is first rotated along with the sleeve (40) about the two tubes (30, 50) until the arcuate segment (42) adjacent to the first tube (30) abuts the first stop (33). Thereafter, the pintle (20) is rotated about the sleeve (40) and the two tubes (30, 50) until the display (70) abuts the body (60).

According to the present invention, the user can raise the display (70) with a small force to separate the display (70) from the body (60) and a large force to completely raise and position the display (70).

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A hinge for a notebook computer, comprising:
   an L-shaped seat (10) with an upright arm and a lateral arm, the seat (10) having a barrel (12) formed on the lateral arm, a passage (13) defined through the barrel (12) and a slot (14) defined in communication with a lower periphery of the passage (13);
   a pintle (20) having a shaft (23) formed at a first end of the pintle and extending in the passage (13) of the seat (10), a tongue (21) formed at a second end of the pintle, and a flange between the shaft (23) and tongue (21);
   a first tube (30) provided between the shaft (23) and the barrel (12) and adjacent to the flange, the first tube (30) having a first tubular part (31) with a first channel defined at an outer periphery of the first tubular part (31), a first opening (32) defined through the first tubular part (31), a first tab (34) extending downwards from the first tubular part (31), a first stop (33) formed at an end of the first tab (34) opposed to the flange, and a first arcuate lug (35) formed at a bottom of the first tub (34) and received in the slot (14);
   a second tube (50) provided between the shaft (23) and the barrel (12) and away from the flange, the second tube (50) having a second tubular part (51) with a second channel defined at an outer periphery of the second tubular part (51), a second opening (52) defined through the second tubular part (51), a second tab (54) extending downwards from the second tubular part (51), a second stop (53) formed at an end of the second tab (54) opposed to the flange, and a second lug (55) formed at a bottom of the second tub (54) and received in the slot (14); and
   a sleeve (40) provided outside the shaft (23) and between the first tube (30) and second tub (50), the sleeve (40) having a third tubular part (41) with a third opening (42), and two arcuate segments (42) formed at two opposed ends of the sleeve (40) and corresponding to the first and second stops (33, 53).

2. The hinge as claimed in claim 1, wherein the seat (10) has a plurality of threaded holes (11) defined through the upright arm.

3. The hinge as claimed in claim 1, wherein the pintle (20) has a plurality of annular recesses (24) defined at the shaft (23).

4. The hinge as claimed in claim 3, wherein the pintle (20) has a plurality of apertures (22) defined through the tongue (21).

5. The hinge as claimed in claim 1, wherein the slot (14) has an inverted T-like shape.

6. The hinge as claimed in claim 1, wherein the first arcuate lug (35) is protruded from a side of the first tab (34) opposed to the first channel and scalloped at a side of the first tab (34) facing the first channel; and the second arcuate (55) is scalloped at a side of the second tab (54) facing the second channel and protruded from a side of the second tab (54) opposed to the second channel.

* * * * *